May 16, 1939. E. C. GODFREY 2,158,230
BEVERAGE GLASS
Filed Sept. 19, 1938
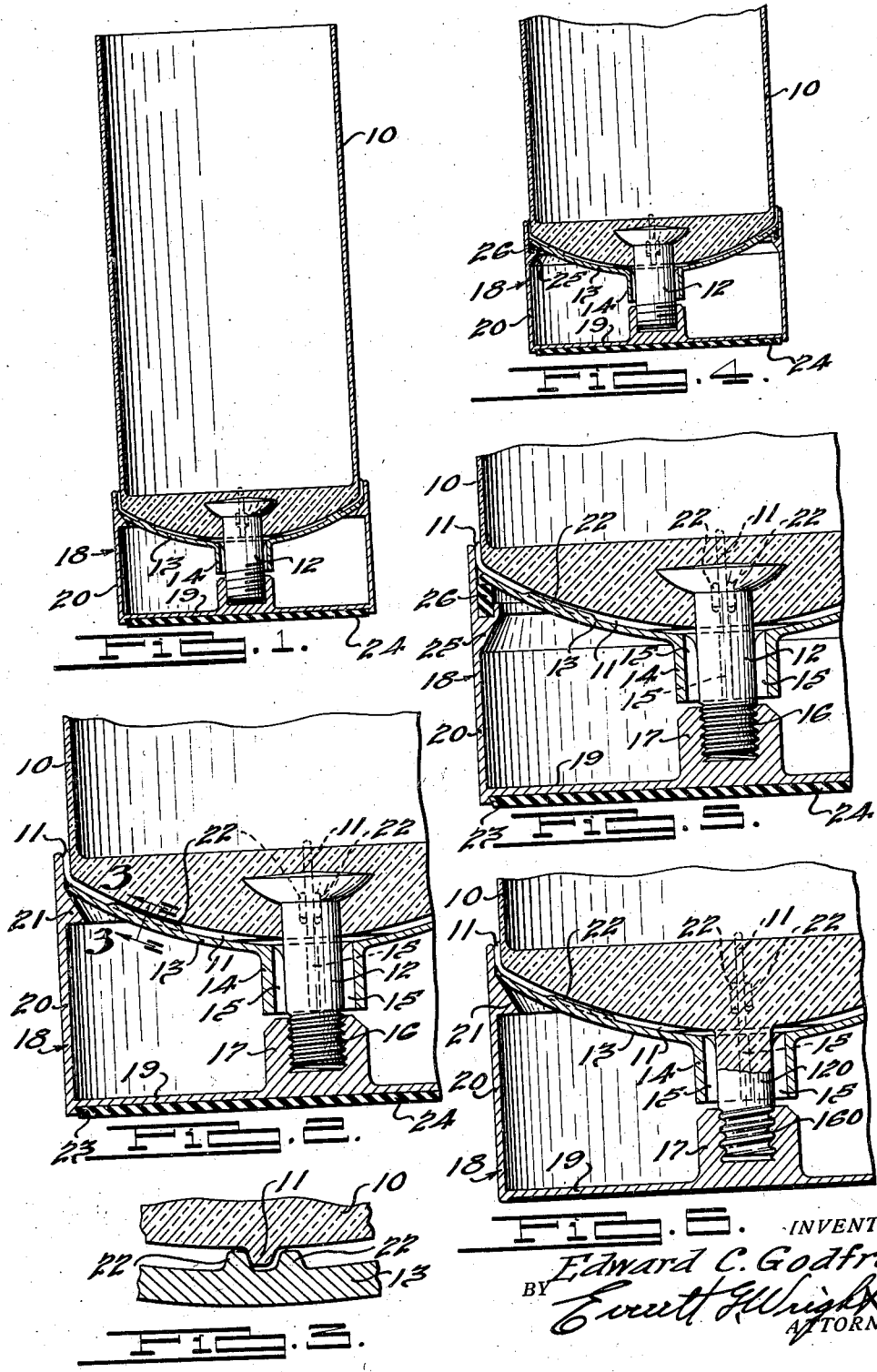
INVENTOR
Edward C. Godfrey
BY
ATTORNEY Patented May 16, 1939

2,158,230

UNITED STATES PATENT OFFICE 2,158,230

BEVERAGE GLASS

Edward C. Godfrey, Detroit, Mich.

Application September 19, 1938, Serial No. 230,602

4 Claims. (Cl. 65—13)

This invention relates to beverage glasses and in particular to novel drip-proof bases therefor into which condensate or other liquid which may collect on the side of a glass may gravitate whereby to prevent the soiling and damaging of table linen, furniture and the like upon which the glasses are generally placed and to prevent dripping of liquid from the outside of the glass on the clothing of a person drinking therefrom.

In the prior art many attempts have been made to provide a satisfactory drip-proof glass that will collect condensate and other liquid from the side thereof, eliminate dripping during use and prevent the spoilage of table linen and furniture upon which the glass may be placed, and, at the same time, provide a practical economical to manufacture, easy to clean construction which will not present a freakish appearance.

With the foregoing in view, the main object of the invention is to provide an improved beverage glass and base adapted to collect condensate and other liquid which may gravitate down the sides thereof and prevent the liquid collected from dripping from the glass during use.

Another object of the invention is to provide a practical, inexpensive, dripless beverage glass constructed of a few sturdy simple parts which may be easily and readily assembled for use and disassembled for cleansing.

Other objects of the invention will become apparent by reference to the following detailed description taken in connection with the accompanying drawing, in which:

Fig. 1 is a vertical sectional view of a beverage glass embodying the invention.

Fig. 2 is an enlarged fragmentary detailed sectional view of the embodiment of the invention disclosed in Fig. 1.

Fig. 3 is a fragmentary sectional view taken on the line 3—3 of Fig. 2.

Fig. 4 is a fragmentary sectional view of a beverage glass embodying the invention in which a pliable seal is employed.

Fig. 5 is an enlarged fragmentary detailed sectional view of the embodiment of the invention disclosed in Fig. 4.

Fig. 6 is an enlarged fragmentary detailed sectional view similar to Fig. 2 showing the use of an integral threaded stem rather than a metal insert as a means for securing the base to the glass.

Referring now to the drawing wherein like numerals refer to like and corresponding parts throughout the several views, the embodiment of the invention disclosed in Figs. 1 to 3 inclusive comprises a drinking glass 10 which has a plurality of radially disposed ribs 11 formed on the convex bottom thereof and which has a threaded insert 12 moulded therein and centrally depending therefrom forming a centrally depending threaded stem. A liquid retainer disc 13 formed to substantially the same shape as the bottom of the glass 10 having a central collar 14 depending therefrom is telescoped over the end of the said threaded stem 12 and is held centrally with respect to the said stem 12 and the glass 10 by a plurality of inwardly projecting radially disposed ribs 15, the depth of the said collar 14 being such as will permit the threads 16 on the lower end of the threaded stem 12 to receive a complementarily internally threaded upwardly and centrally disposed thimble 17 preferably integrally formed in the liquid receiver 18.

The liquid receiver 18 is preferably formed cup shaped with a flat bottom 19 and a vertically disposed annular wall 20 which has an inside diameter equal to the diameter of the glass 10 taken at the outside of the radially disposed ribs 11 thereof which extend a short distance up the sides of the said glass 10 as best shown in Fig. 4. The said liquid receiver 18 is provided with an annular inwardly and downwardly flared seat 21 disposed at the proper height above the bottom thereof to engage the outer periphery of the retainer disc 13 as indicated in Fig. 2 whereby to make a liquid tight seal between the outer periphery of the said retainer disc 13 and the inner periphery of the liquid receiver 18 when the said liquid receiver 18 is threaded on the lower end 16 of the stem 12 depending from the glass 10. The top of the retainer disc 13 is preferably provided with one or more pairs of short radially disposed spaced ribs 22 between which one of the radially disposed ribs 15 on the bottom of the glass 10 is positioned when assembling the retainer disc 13 and liquid receiver 18 on the bottom thereof to prevent the said liquid retainer disc 13 from turning with the liquid receiver 18 when the seat 21 of the said liquid receiver 18 is tightened against the periphery of the said retainer disc 13 whereby to avoid wear and chipping of the ribs 11 formed on the bottom of the glass 10.

Obviously, any condensate or other liquid gravitating down the sides of the glass 10 runs within the top of the liquid receiver 18 and along the top of the liquid retainer disc 13 and down the inside of the depending collar 14 thereof into the liquid receiver 18 from whence it cannot escape unless the liquid receiver 18 is removed from the glass 10.

The volume of the said liquid receiver 18 is purposely made many times greater than the volume of liquid it is expected to receive to avoid any possibility of the contents thereof running out between the liquid retainer disc 13 and the bottom of the glass 10.

The bottom of the said liquid receiver 18 may be provided with an annular re-entrant groove 23 therearound to receive moulded or other scratch preventing pads 24 if desired.

The embodiment of the invention disclosed in Figs. 4 and 5 is precisely the same as the embodiment disclosed in Figs. 1, 2 and 3 except that instead of the use of a metal to metal or composition to composition seal between the liquid retainer disc 13 and the liquid receiver 18, an annular bracket 25 is provided in the construction disclosed in Figs. 4 and 5 instead of a flared seat 21 which receives and supports an annular washer 26 of hard but slightly resilient rubber 1, leather or the like, the said washer 26 providing a tight seal between the liquid receiver 18 and the liquid retainer disc 13.

Fig. 6 discloses a modification of the embodiment of the invention disclosed in Figs. 1, 2 and 3 which is identical thereto except that a glass stem 120 integral with said glass 10 threaded at 160 is substituted for the centrally disposed threaded insert 12 forming a centrally depending threaded stem on the bottom of the glass 10, and that no pad 24 is provided on the bottom of the liquid receiver 18. The threads in the internally threaded upwardly disposed thimble 17 of the liquid receiver 18 are made complementary to the round glass threads 160 used on the glass stem 120.

Although but two embodiments of the invention and one modification thereof have been shown and described herein, it is obvious that many changes may be made in the size, shape, details and arrangement of the various elements of the invention without departing from the spirit thereof as defined in the appended claims.

I claim:

1. A dripless beverage glass comprising, in combination, a glass including a centrally disposed depending stem, a liquid receiver having the inner periphery of the top thereof slightly larger than the outer periphery of the bottom of the said glass removably secured on the depending stem of the said glass, a centrally apertured liquid retainer disc adapted to serve as a cover for the said liquid receiver disposed in the top of the said liquid receiver below the said glass, the said liquid retainer being formed to drain downward into the said liquid receiver, means for holding the said liquid retainer spaced from the bottom of the said glass, and means for supporting the said liquid retainer in spaced relationship to the bottom of the said glass and for effecting a seal between the said glass and for effecting a seal between the inner periphery of the said liquid receiver and the outer periphery of the said liquid retainer simultaneously with securing the said liquid retainer on the stem of the said glass, the volume of the said liquid receiver and the relationship of the said liquid retainer thereto being such that liquid gravitating into the said liquid receiver will not spill therefrom during use.

2. A dripless beverage glass comprising, in combination, a glass including a centrally disposed depending threaded stem, a liquid receiver having the inner periphery of the top thereof slightly larger than the outer periphery of the bottom of the said glass threaded on the depending stem of the said glass, a centrally apertured liquid retainer disc adapted to serve as a cover for the said liquid receiver disposed in the top of the said liquid receiver below the said glass, the said liquid retainer being formed to drain downward into the said liquid receiver, means for holding the said liquid retainer spaced from the bottom of the said glass, and means for supporting the said liquid retainer in spaced relationship to the bottom of the said glass and for effecting a seal between the said glass and for effecting a seal between the inner periphery of the said liquid receiver and the outer periphery of the said liquid retainer simultaneously with threading the said liquid retainer on the stem of the said glass, the volume of the said liquid receiver and the relationship of the said liquid retainer thereto being such that liquid gravitating into the said liquid receiver will not spill therefrom during use.

3. A dripless beverage glass comprising, in combination, a glass including a centrally disposed depending threaded stem, a liquid receiver having the inner periphery of the top thereof slightly larger than the outer periphery of the bottom of the said glass threaded on the depending stem of the said glass, the upper peripheral edge of the said liquid receiver being disposed in outwardly and upwardly spaced relationship with respect to the lower outer periphery of the said glass, a centrally apertured liquid retainer disc adapted to serve as a cover for the said liquid receiver disposed in the top of the said liquid receiver below the said glass and in spaced relationship to the centrally depending stem of the said glass, the said liquid retainer being formed to drain centrally downward into the said liquid receiver, means for holding the said liquid retainer spaced from the bottom of the said glass, means for holding the said liquid retainer central with respect to and spaced from the depending stem of the said glass, and an annular inwardly and downwardly flared seat formed on the inner wall of the said liquid receiver vertically located to engage the outer periphery of the said liquid retainer and effect a seal between the said liquid receiver and the said liquid retainer when the said liquid receiver is threaded on the stem of the said glass.

4. A dripless beverage glass comprising, in combination, a glass including a centrally disposed depending threaded stem, a liquid receiver having the inner periphery of the top thereof slightly larger than the outer periphery of the bottom of the said glass threaded on the depending stem of the said glass, the upper peripheral edge of the said liquid receiver being disposed in outwardly and upwardly spaced relationship with respect to the lower outer periphery of the said glass, a centrally apertured liquid retainer disc adapted to serve as a cover for the said liquid receiver below posed in the top of the said liquid receiver below the said glass and in spaced relationship to the centrally depending stem of the said glass, the said liquid retainer being formed to drain centrally downward into the said liquid receiver, means for holding the said liquid retainer spaced from the bottom of the said glass, means for holding the said liquid retainer central with respect to and spaced from the depending stem of the said glass, an annular upwardly disposed bracket formed on the inner wall of the said liquid receiver, and a resilient washer supported on said bracket, the said bracket and washer supported thereon being so vertically located with respect to the bottom of the said liquid retainer as to effect a seal between the said liquid receiver and liquid retainer when the said liquid receiver is threaded on the stem of the said glass.

EDWARD C. GODFREY.